Jan. 25, 1966   R. G. LE TOURNEAU   3,231,303
ROTATABLE GRAPPLE
Filed April 1, 1963

INVENTOR.
Robert G. LeTourneau
BY
Wm. T. Wofford
Attorney

United States Patent Office 3,231,303
Patented Jan. 25, 1966

3,231,303
ROTATABLE GRAPPLE
Robert G. LeTourneau, P.O. Box 2307, Longview, Tex.
Filed Apr. 1, 1963, Ser. No. 269,358
3 Claims. (Cl. 294—88)

My invention relates to improvements in material handling devices and, more particularly, to an improved type rotatable grapple.

In many industries a grapple device is used to pick up a load of material and to transport the load to another location, where it is released. Grapple devices which are adapted to be oriented are well suited for such purposes and are frequently used. However, during the loading, transporting and unloading operations, the load in the grapple mechanism may engage some obstruction which will interrupt its free rotation. Moreover, the sudden encounter with the obstruction may cause irreparable damage to the grapple mechanism or its orienting drive mechanism. It is desirable, therefore, that the grapple mechanism should be movable relative to its orienting drive mechanism, when necessary, and that it should be movable with its orienting drive mechanism under other ordinary and normal circumstances.

Accordingly, it is an object of the present invention to provide an improved rotatable grapple apparatus wherein there is incorporated means for effectively preventing the type of damage above mentioned.

Another object of the invention is to provide, for a rotatable grapple apparatus, a simple and inexpensive protective connection between the grapple mechanism and its orienting drive mechanism.

Figure 1:
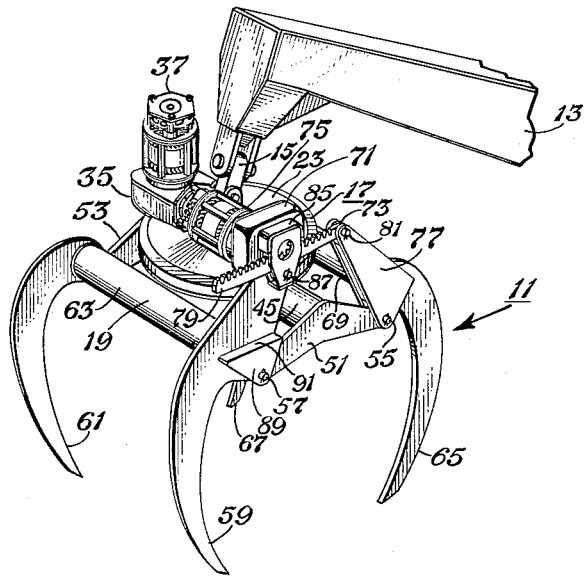
Figure 2:
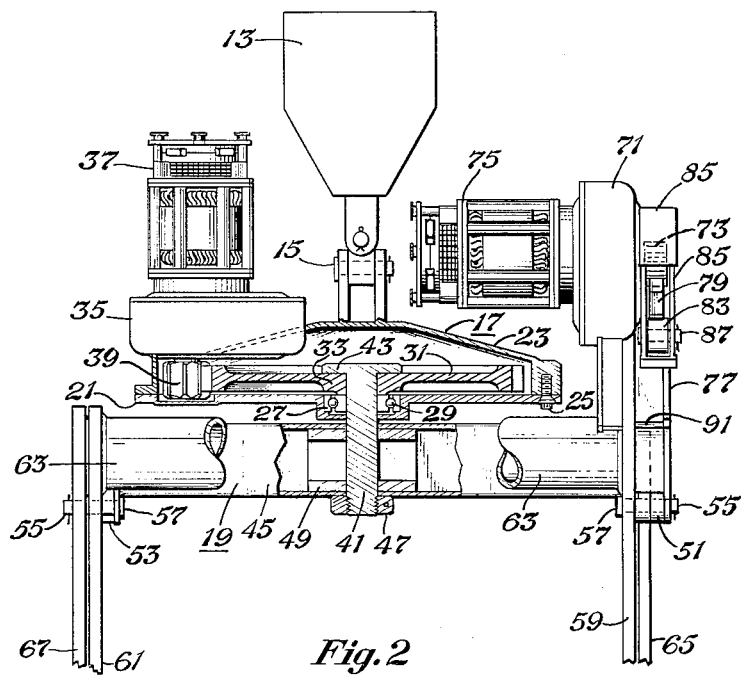

These and other objects are effected by my invention as will be apparent from the following description taken in accordance with the accompanying drawing, forming a part of this application, in which:

FIG. 1 is a schematic perspective view of a rotatable grapple in accordance with a preferred embodiment of the present invention; and FIG. 2 is an elevational view, partly in section, of the device of FIG. 1.

FIG. 1 illustrates a rotatable grapple 11 which is suspended from a boom 13 by means of a universal-type of connection 15, or other suitable type of suspension connecting linkage. The grapple 11 includes a grapple-rotating mechanism 17 and a grapple mechanism 19.

The grapple-rotating mechanism 17 includes a gear support plate 21 (see FIG. 2) and a gear housing 23 which is suitably attached to the support plate 21 by cap screw fasteners 25, or in any other suitable manner. The housing 23 is also fixed to the lower end portion of the universal-type of connection 15, as by welding, or in any other appropriate manner. The central region of the support plate 21 is provided with a recess or well 27 in which a suitable thrust bearing 29 is disposed. A bull gear 31, having a hub 33 which engages the thrust bearing 29, is disposed to rotate in a generally horizontal plane within the gear housing 23. A gear reduction 35, which is driven by an electric motor 37 and which has an output pinion 39, is mounted in any suitable manner on the gear housing 23 so that the output pinion 39 engages and drives the bull gear 31.

The grapple mechanism 19 is pivotally suspended from the rotating mechanism 17 on a pin 41 which extends axially through both the hub 33 and the bearing 29. The pin 41 has an enlarged upper end, or head 43 that frictionally bears on the upper surface of the hub 33. The lower end of the pin 41 extends through a main support member 45 which is rotatively maintained on the pin 41 by a nut 47, or other suitable device.

The support member 45 comprises a tubular member which extends laterally of and generally perpendicular to the axis of the pin 41. Another tubular member 49 is closely fitted within the support member 45 in the region of the pin 41. The tubular member 49 is provided, also, with a hole through which the pin 41 extends. The tubular member 49 has, preferably, a substantially heavier wall thickness than the member 45, so as to provide an effective reinforcement for the support member 45 in the region of the support pin 41. A pair of plates 51, 53 are fixed to, and disposed transversely of, the ends of the support member 45. Each plate 51, 53 has a pair of holes in the extremities of it, and in each hole there is a pivot pin 55, 57. The respective pivot pins 55, 57 determine axes of rotation that are substantially parallel to the member 45. A pair of grapple tines 59, 61, which are rigidly connected together by a tubular member 63, are pivotally connected to the plates 51, 53 by the pivot pins 57. Likewise, another pair of grapple tines 65, 67, which are rigidly connected together by a tubular member 69, are pivotally connected to the plates 51, 53 by the pivot pins 55. The tines 59, 61 and 65, 67 are made, preferably, of plate material that is arcuate in form, as indicated generally in FIG. 1. The arcuate tines 59, 65 extend above the tubular members 63, 69, and there is fixed to both the tine 59 and the tubular member 63 a gear reduction 71 having an output pinion 73. An electric motor 75 is suitably mounted on the gear reduction gear as its driving unit. A triangular plate 77 is disposed and fixed in a generally spaced parallel relation to the upper part of the tine 65 which extends above the tubular member 69. A length of rack 79 is pivotally connected at one end to the upper end of the tine 65 and the plate 77 by a pin 81. The length of rack 79 is maintained in engagement with the output pinion 73 by a back-up roller 83 which is journaled in the pinion housing 85 on a pin 87. A small generally triangular plate 89 is fixed to and maintained parallel to the plate 51 by a plate 91 disposed between them; the plate 89 serving as a support for one end of the pin 57.

In order to describe the manner in which the grapple 11 operates, reference is made to the drawing, and in particular to FIG. 1. The grapple 11 is shown in an operative position, being partially open and ready to engage a load of logs or other material. It is evident that the ends of the tines 59, 61 and 65, 67 may be brought toward each other by simply actuating the pinion 73 of the gear reduction 71. This causes the pinion 73 to move relative to the rack 79 and away from the pinned end at 81. The tines 59, 61 and 65, 67 may, of course, be opened further by actuating the pinion 73 in an opposite direction. The pinion 73 then moves relative to the rack 79 toward the pinned end 81.

Whenever, during loading or unloading of material, it is necessary or desirable to orient the grapple in some particular manner, it is only necessary to actuate the gear reduction 35 and pinion 39. The moving pinion 39 causes the bull gear 31, the pin 41, and the grapple mechanism 19 to rotate synchronously, being supported on the thrust bearing 29. Now, should the loaded grapple strike an obstruction during rotation, or should the free rotation thereof be interrupted for some other external reason, there will be relative movement between the grapple mechanism 19 and the bull gear 31. This relative movement results from the manner of supporting the grapple mechanism 19 from the rotating mechanism. It was mentioned hereinbefore that the head 43 of the pin 41, upon which the grapple mechanism 19 suspends, is only in frictional contact with the hub 33 of the bull gear. Likewise, the grapple mechanism 19 is free to rotate about the axis of the pin 41 and relative to it under the same conditions. And so, when the free rotation of the grapple mechanism 19 is arrested, either the bull gear 31, or the bull gear and the pin 41, turns relative to the grapple mechanism 19. This relative movement continues until the grapple mechanism 19 becomes freely rotative again, whereupon the bull gear 31, the pin 41 and the grapple mechanism 19 resume synchronous rotation.

While I have shown my invention in only one form, it will be obvious to those skilled in the art that it is not so limited, but is susceptible of various changes and modifications without departing from the spirit thereof.

I claim:

1. A grapple comprising: support means; a bull gear having a hub journaled to said support means for rotation about the central axis; a pin extending axially through said hub and having an enlarged upper end portion frictionally engaging and supported on said hub; a grapple mechanism rotatably mounted on said pin adjacent the lower end portion thereof; means for driving said bull gear about said axis to orient said grapple mechanism; and means for operating said grapple mechanism.

2. A grapple comprising: support means; a gear having a hub mounted on said support means for rotation about the hub central axis; a grapple mechanism; linkage means suspending said grapple mechanism from said gear, the said grapple mechanism being rotatably mounted on said linkage with said linkage frictionally engaging and supported on said hub; means for driving said gear about said axis to orient said grapple mechanism; and means for operating said grapple mechanism.

3. A grapple comprising: support means; a rotatable driven plate having a hub mounted on said support means for movement about the hub central axis; a pin extending axially through said hub and having an enlarged upper end portion frictionally engaging and supported on said hub; a grapple mechanism rotatably mounted on said pin adjacent the lower end portion thereof; means for driving said driven plate about said axis to orient said grapple mechanism; and means for operating said grapple mechanism.

References Cited by the Examiner
UNITED STATES PATENTS

| | | | |
|---|---|---|---|
| 584,483 | 6/1897 | Richards | 64—30 |
| 1,577,283 | 3/1926 | Mitchell | 294—82 |
| 1,611,963 | 12/1926 | Valentine | 64—30 |
| 2,129,158 | 9/1938 | Williams | 294—88 |
| 2,914,203 | 11/1959 | Gafner. | |

M. HENSON WOOD, Jr., *Primary Examiner.*

ANDRES H. NIELSEN, SAMUEL F. COLEMAN,
*Examiners.*